United States Patent [19]

Pittion et al.

[11] Patent Number: 4,478,381
[45] Date of Patent: Oct. 23, 1984

[54] PIPE CLAMP

[75] Inventors: Philippe Pittion, Sassenage; Guy Andre, Seyssinet-Pariset; Gerald Souillard, Seyssinet-Pariset; Jean-Louis J'espere, Seyssinet-Pariset; Bernard Houte, Eybens, all of France

[73] Assignee: A. Raymond, Lorrach, Fed. Rep. of Germany

[21] Appl. No.: 393,490

[22] Filed: Jun. 29, 1982

[30] Foreign Application Priority Data

Jul. 4, 1981 [DE] Fed. Rep. of Germany ....... 3126488

[51] Int. Cl.³ ............................................. F16L 3/24
[52] U.S. Cl. ..................................... 248/71; 24/487; 248/74.2; 248/74.3
[58] Field of Search ............ 248/71, 73, 74 PB, 74 A, 248/74 B, 68 CB, 49, 316.7, 62; 24/249 R

[56] References Cited

U.S. PATENT DOCUMENTS 3,088,702  5/1963  Orenick et al. ................. 248/71
3,323,766  6/1967  Schauster ....................... 248/62
3,954,238  5/1976  Nivet ......................... 248/68 CB

FOREIGN PATENT DOCUMENTS 1345011  1/1974  United Kingdom .......... 248/74 PB
2066887  7/1981  United Kingdom ............ 248/74 A Primary Examiner—William H. Schultz
Assistant Examiner—Ramon O. Ramirez
Attorney, Agent, or Firm—Finnegan, Henderson, Farabow, Garrett & Dunner

[57] ABSTRACT

An elastic pipe clamp having a lower yoke, a fastener foot or the like for anchoring the lower yoke to a fixed surface and a cooperating upper yoke, the pipe being securely held between the yokes when they are locked together in a positive manner. A hinge-band pivotally connects one end of the upper yoke to one end of the lower yoke and mutually engaging locking hooks are provided on the opposite ends of the yoke from the hinge band for locking the yokes together. At least two (2) beaks on the hinged end of one of the yokes curve inwardly with respect to and over the hinge-band, the beaks being adjacent to the outer edges of the yoke with their outer arcs being tangent to the inside wall of the yoke. Cooperating recesses are provided in the other yoke that are open on their outer sides and have upper and lower walls with a radius curvature similar to the curvature of the beaks, whereby the beaks substantially fill the recesses when the clamp is closed.

2 Claims, 7 Drawing Figures

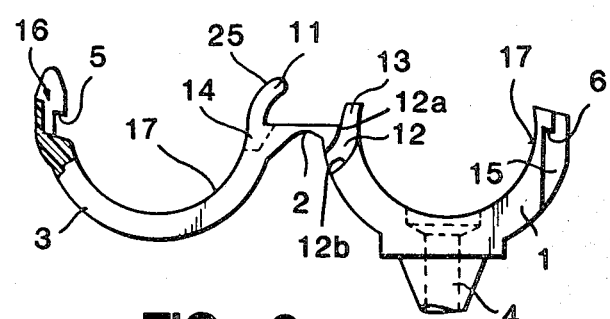
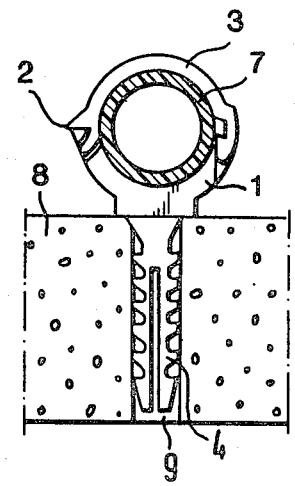
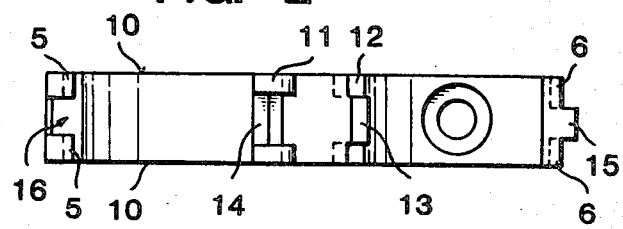
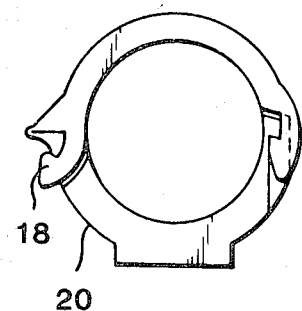
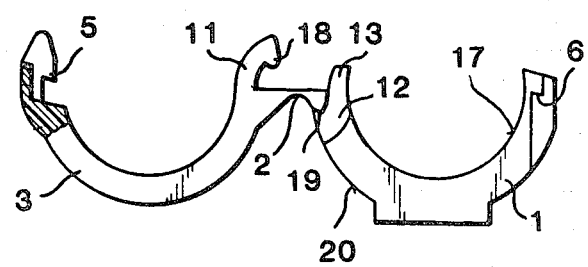
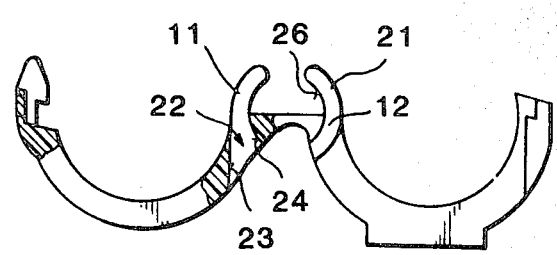
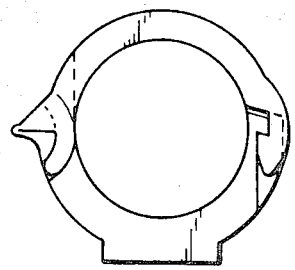

PIPE CLAMP

BACKGROUND OF THE INVENTION

This invention relates to an elastic pipe clamp, preferably of a moldable and flexible plastic material, having a lower yoke, means for anchoring the clamp to a fixed structure and an upper yoke pivotally joined to the lower yoke by a hinge band. The two yokes are connectable at their free ends by at least two mutually opposed and mutually engagable hooks to hold the pipe in the clamp in a positive manner.

Plastic pipe clamps of this general type in which one side of the upper yoke is integrally hinged to one side of the lower yoke are known as shown, for example, in published German Patent Application No. 24 46 133. In FIG. 3 of that application there is shown such a clamp in which the free ends of the yokes are lockable together and in which the upper yoke has a beak curving out and over the hinge connection between the yokes with a corresponding recess for the beak in the lower yoke. According to the teachings of the patent, the hook rests against the underside of the hinge band when the yokes are in locked position. This hook is supposed to provide additional locking on the hinged side of the clamp to prevent the clamp from prematurely snapping open on that side in case the hinge band either breaks or tears due to deterioration of the material from which the clamp is made.

In use, however, this kind of hinge-band locking has not proved entirely satisfactory. Because the clamp must be ejected from a mold during its manufacture, the inside walls of the recess must have straight, parallel sides and as a consequence the beak cannot be held in place by the side walls of the recess. If for instance the hinge band were to unexpectedly break, it will no longer hold the beak in place and the beak, being more or less flexible, will then bend toward the curved inside wall nearest the center of the clamp and easily slip out of the recess.

SUMMARY OF THE INVENTION

It is therefore an object of the present invention to provide a locking means at the hinge band side of a pipe clamp that ensures that the clamp will remain locked.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the pipe clamp of the invention comprises: a lower yoke, means for anchoring the lower yoke to a fixed surface, a cooperating upper yoke, the pipe being securely held between the yokes when the yokes are locked together in a positive manner, a hinge-band pivotally connecting one end of the upper yoke to one end of the lower yoke, mutually engaging locking hooks on the opposite ends of the yoke from the hinge-band for locking the yokes together, at least two beaks on the hinged end of one of the yokes that curve inwardly with respect to and over the hinge-band, the beaks being adjacent to the outer edges of the yoke with their outer arcs being tangent to the inside wall of the yoke, cooperating recesses for the beaks in the other yoke being open on their outer sides and having upper and lower walls with a radius curvature similar to the curvature of the beaks, whereby the beaks substantially fill the recesses when the clamp is closed.

DETAILED DESCRIPTION OF THE INVENTION

Further features of the invention and its advantages can be found in the description which follows and in the following drawings:

FIG. 1 is a pipe clamp seen in side view and in opened position,

FIG. 2 is a top view of the clamp of FIG. 1,

FIG. 3 is the pipe clamp of FIG. 1 in an assembled and locked position,

FIG. 4 is a similar pipe clamp with an alternative beak design and in an open position, FIG. 5 is the pipe clamp of FIG. 4 in closed position, FIG. 6 is a pipe clamp with yet another beak design and in an open position, and FIG. 7 is the pipe clamp of FIG. 6 in closed position.

The pipe clamp shown in FIGS. 1 and 2 in the opened state consists essentially of a lower clamp yoke 1 and an upper clamp yoke 3 joined in pivotable manner by a so-called "hinge-band" 2 integrally connected to both yokes. Hooks 5 are located on the free end of upper clamp yoke 3, which are formed to engage with mating hooks 6 on the free end of lower clamp yoke 1. These hooks hold the clamp about the pipe when the clamp yokes are snapped together as shown in FIG. 3.

The primary purpose of the clamp is to anchor pipes 7 or similar elongated parts to a foundation, for instance to a masonry or concrete wall. For that purpose the clamp is provided with means for anchoring the clamp to a fixed surface. This means, for example, can be a fastener foot 4 for insertion into a hole 9 in a masonry wall 8 which, as shown, can be a wall anchor or the like.

In accordance with the invention and as shown in FIGS. 1 and 2, beaks or hooks 11 are provided on the hinged end of upper clamp yoke 3 adjacent its outer edges 10. The edges 10 curve inwardly with respect to and over hinge 2, their outer arcs 25 being tangential to the inside wall 17 of the upper yoke. Cooperating recesses 12, open on their sides, are provided on the corresponding end of lower yoke 1, which recesses are also adjacent to the edges of the yoke. The recesses 12 have upper and lower walls 12a and 12b, respectively, that have the same radius of curvature as the beaks 11 and are equally spaced from the hinge band 2. When upper yoke 3 is closed, the beaks completely fill the space in recesses 12, so that there is hardly any play left (See FIG. 3).

By providing beaks on the outer edges of the clamp yoke near the hinge band as shown, rather than in the middle as in the prior art, it is possible to mold the inside walls of the recesses concentrically with the outer walls of the beaks and of near similar size because the ejection of the clamps from a mold is thereby simplified. Consequently the beaks can no longer bend outwardly or straighten out as readily as in the prior art as a result of the shape of the recesses when forces tending to open the clamp occur. In this manner the clamp is more securely locked, so that if hinge band 2 is torn off, the clamp yokes 1 and 3 will still remain joined.

A short guide stud 13 is preferably provided that extends upwardly from the inside wall 17 of the lower yoke 1 between recesses 12 and enters a corresponding niche 14 in upper clamp yoke 3 when the clamp is snapped together. This stud helps to guide beaks 11 into recesses 12 when the clamp is closed. Also a similar guide rib 15 can be provided between mating hooks 6 on lower yoke 1, which, when the yokes 1 and 3 are brought together, extends into a corresponding recess 16 between hooks 5 on upper yoke 3 and helps to guide hooks 5 into engagement with hooks 6.

Both the inside wall 17 on the hook side of lower yoke 1 and the guide stud 13 on the hinge side extend a little beyond the midpoint of the half-circle of lower yoke 1. This helps to hold a pipe 7 temporarily in place until the upper clamp yoke 3 has been closed. The slight clamping action provided by these extensions thus allows an assembler to perform a pre-assembly when setting a pipe.

FIGS. 4 and 5 show a similar pipe clamp with an alternative beak design for holding the two yokes of the clamp together. In this embodiment the two beaks 11 have hooks 18 on their outer ends pointing toward the hinge band 2, which cooperate with catch surfaces 19 on the inner arc of the upper wall 12a of recess 12 in lower yoke 1. The hooks 18 click into position behind catch surfaces 19 approximately simulatenously with the mutual engagement of catch hooks 5 and 6 when the upper yoke 3 is closed. In this way the locking effect of the clamp is further reinforced.

The recesses 12 in this instance are somewhat wider between the upper and lower walls than in the device of FIGS. 1-3, (See FIG. 5) so that the hooks 18 on the ends of beaks 11 can pass through the recesses 12 to their locked position. The recesses will, of course, also expand somewhat due to the elastic nature of the clamp.

So that the clamp can be reopened in case of need, the hooks 18 of beaks 11 extend somewhat beyond the outside surface 20 of lower clamp yoke 1 when in the closed state. This permits the hooks 18 to be pressed away from catch surfaces 19 while simultaneously snapping hooks 5 away from mating hooks 6 and pulling upwardly on clamp yoke 3 about hinge 2 to open the clamp.

FIGS. 6 and 7 show yet another alternative embodiment of this invention. In this embodiment and in addition to the two beaks 11 on the upper yoke 3, a beak 21 is provided on the lower yoke at the same distance from the hinge band as beaks 11 and is directed toward the upper yoke with the same radius of curvature. Beak 21 extends into a recess 22 between beaks 11 when the pipe clamp is closed in much the same manner that stud 13 extends into recess 14. The inside wall 24 of recess 22 nearest the hinge 2 is of the same radius of curvature as the inside arc 26 of beak 21 while the other wall 23 is straight for reasons of mold ejection during manufacture.

It will be apparent to those skilled in the art that various modifications can be made without departing from the scope or spirit of the invention.

What is claimed is:

1. An elastic clamp for a pipe or the like comprising: a lower yoke, means for anchoring the lower yoke to a fixed surface, a cooperating upper yoke, the pipe being securely held between the yokes when the yokes are locked together in a positive manner, a hinge-band pivotally connecting one end of the upper yoke to one end of the lower yoke, mutually engaging locking hooks on the opposite ends of the yokes from the hinge-band for locking the yokes together, at least two arcuate beaks on the hinged end of one of the yokes that curve inwardly with respect to and over the hinge-band, the beaks being adjacent to the outer edges of the one yoke leaving a recess therebetween, the surface of the arcs of the outer edges of the beaks being a continuation of the surface of the inside wall of the one yoke, cooperating recesses for the beaks in the other yoke being open on their outer sides and having upper and lower walls with a radius of curvature similar to the curvature of the beaks, the beaks substantially filling the cooperating recesses when the clamp is closed, the beaks being located on the upper yoke of the clamp and the cooperating recesses being located in the lower yoke clamp, and locking catches on the outer ends of the beaks, and cooperating catch surfaces at the opposite ends of the cooperating recesses from the ends through which the beaks are inserted, the catches of the beaks engaging the catch surfaces simultaneously with engagement of the locking hooks when the clamp is closed.

2. The elastic clamp of claim 1 in which the catches on the beaks when engaged with the catch surfaces project beyond the outer wall of the lower yoke clamp.

* * * * *